May 12, 1936. D. K. DEAN ET AL 2,040,431
FRACTIONATING APPARATUS
Filed April 23, 1930
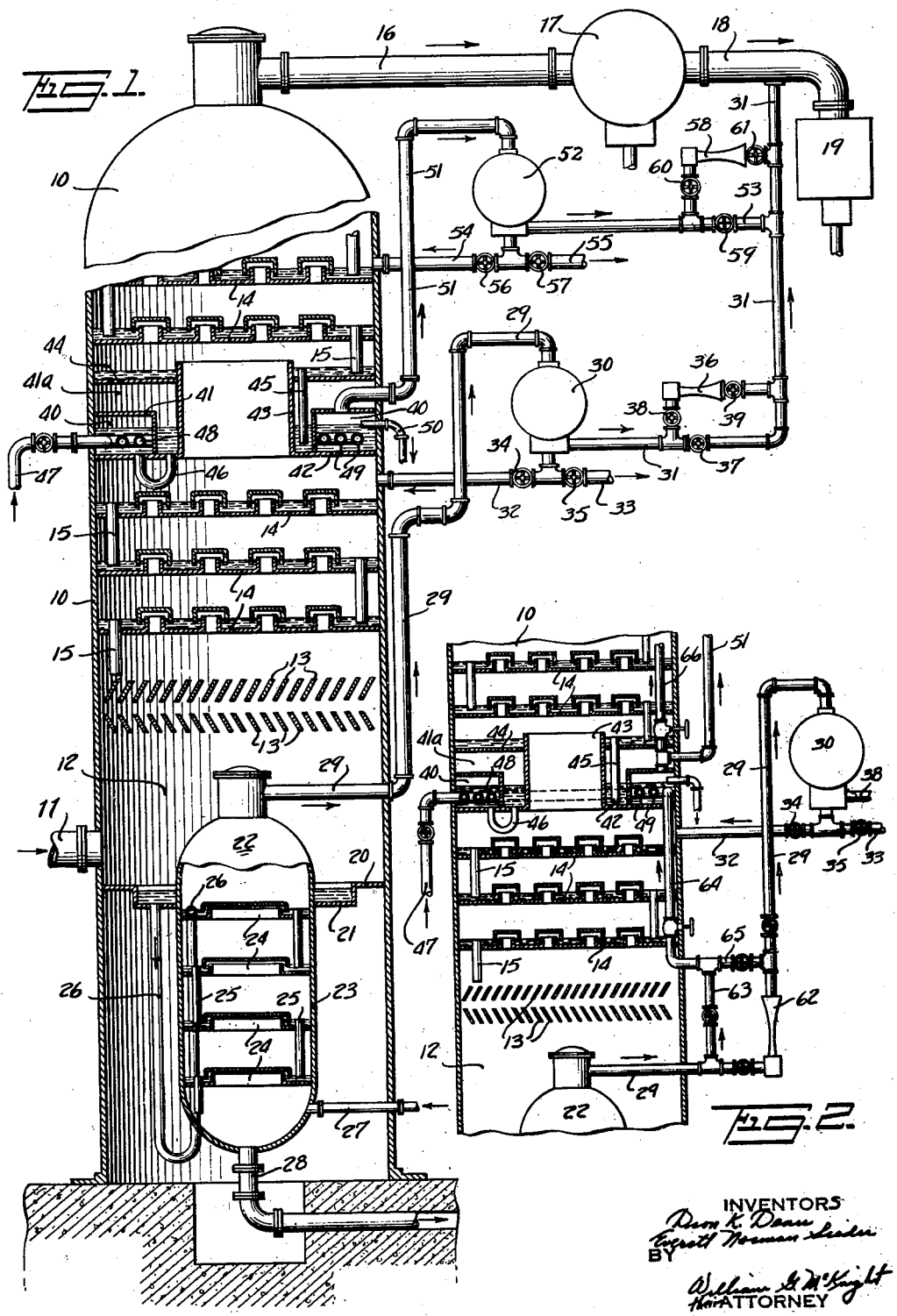

Patented May 12, 1936

2,040,431

UNITED STATES PATENT OFFICE 2,040,431

FRACTIONATING APPARATUS

Dion K. Dean, Rahway, and Everett Norman Sieder, Elizabeth, N. J., assignors to Foster Wheeler Corporation, New York, N. Y., a corporation of New York Application April 23, 1930, Serial No. 446,443

33 Claims. (Cl. 196—114)

This invention relates to the fractional distillation of composite liquids, such as hydrocarbon oils and the like, and more particularly to vacuum fractionating systems and methods of operating the same.

In the fractional distillation of hydrocarbon oils and the like in vacuum fractionating towers, the oil which has been previously heated to a high temperature is generally introduced into the base of the tower at a temperature sufficiently high to flash a portion of the oil into vapor. The vapor flashed off is customarily passed through fractionating or distilling sections of the tower generally comprising a series of bubble trays, where the vapor is passed countercurrent to reflux oil with a consequent fractionation of the condensible constituents of the vapor. The vapor not condensed in its passage through the bubble trays ordinarily passes out of the top of the tower through suitable heat exchanger equipment to vacuum producing condensers.

The path over which the vapor flows from the flash chamber at the base of the tower to the condensing equipment is relatively long and the resistance to the flow of the vapor along this path through the many bubble trays, vapor lines and heat exchanger equipment, is usually appreciable. As a result of this resistance, an appreciable amount of the vacuum produced by the condensing equipment is lost by the friction developed in the flow of the vapor through the tower.

Moreover, in fractionating towers of this type, stripping steam is generally introduced directly into the liquid oil at desired points in the tower to effect a final separation of the light ends that may be contained in the oil at such points. As is generally understood, the introduction of stripping steam causes a lowering of the partial oil vapor pressures throughout the body of the oil to such an extent that the light ends contained therein will be vaporized and carried off with the stripping steam. Because of the fact that the total absolute pressures at the points of stripping in vacuum fractionating towers are generally appreciably higher than that corresponding to the vacuum produced by the condensing equipment, excessively large amounts of steam must ordinarily be used for stripping in order to reduce the partial oil vapor pressures to values low enough to properly rid the oil of the light ends. The use of this excessive amount of steam usually tends to increase the pressure drop caused by the friction in the flow of the oil vapors from the flash chamber through the tower because the stripping steam at times occupies as large a volume as the oil vapors themselves and results in a material reduction in the economy of operation of the fractionating system, and, in some cases, affects unfavorably the final products produced.

This invention contemplates the provision of a vacuum fractionating system or tower in which the pressure drop ordinarily due to the friction in the flow of vapors therethrough and to the stripping steam introduced therein is avoided; the vacuum at the flash chamber in the system or tower is increased; practically the full vacuum produced by the condensing equipment is made available directly within the stripping sections, and the amount of steam necessary for effective stripping is materially decreased.

The invention is characterized by the fact that the several stripping sections in the fractionating system or tower are enclosed and the stripping steam introduced into the stripping sections together with the vapors evolved therein, are caused to by-pass the fractionating or distilling sections of the tower in their path of travel to the condensing apparatus, instead of passing through the fractionating or distilling sections as has generally been the practice heretofore.

The invention is further characterized by the fact that additional vacuum producing means is provided in the path of travel of the stripping steam and entrained vapors from the stripping sections to the condensing equipment and which by-passes the fractionating sections, whereby higher vacua are produced in the stripping sections than in the fractionating or distillating sections of the system.

Other characteristics, objects and features of the invention will be apparent from the following description taken in connection with the accompanying drawing forming a part of this application, in which:

Fig. 1 is a more or less diagrammatic view, principally in longitudinal section, of a vacuum fractionating tower and associated equipment embodying the invention; and Fig. 2 is a sectional view similar to Fig. 1 of a portion of a vacuum fractionating tower embodying another form of the invention.

Like characters of reference refer to similar parts throughout the several views.

Referring to the drawing, 10 represents the shell of a vacuum fractionating tower having an oil inlet 11, a flash chamber 12, baffle plates 13 and bubble trays 14 provided with downflow pipes 15. A vapor line 16 connects the top of the tower with a heat exchanger 17 and vapor line 18 connects the heat exchanger with a barometric condenser or other suitable vacuum producing equipment 19.

Hitherto, in fractionating towers of this type, stripping steam has been introduced directly into the body of oil that collects at the bottom of the tower in the flash chamber and also in the stripping sections located at various points in the tower, to remove the lighter or lower boiling constituents therefrom. The stripping steam introduced at these points, together with the evolved oil vapors, have been required to pass through the entire tower to reach the condensing equipment, and as a result of the friction developed in the flow of these vapors through the bubble trays, heat exchanger equipment and vapor lines, there has been an excessive pressure drop throughout the tower with the consequent disadvantages referred to above.

In accordance with this invention, however, the zones in the tower into which stripping steam is introduced, or the stripping sections, are entirely enclosed in any suitable manner so that they will be cut off from the tower proper and so that the steam and vapors from the stripping sections will not flow into the fractionating sections of the tower but will by-pass the same.

As shown, a plate 20, having preferably a depressed portion 21, is mounted in the base of the tower below oil inlet 11. An enclosed stripping section represented generally at 22 is mounted in the base of the tower preferably in the position shown with relation to the plate 20. This stripping section preferably comprises a substantially cylindrical shell 23 with a series of spaced bubble trays 24 therein, provided with downflow pipes 25. Oil enters the stripping section 22 from the flash chamber 12 through a loop seal 26, stripping steam is introduced thereinto through inlet 27 and bottoms are drawn off from the stripping section through the outlet 28. The stripping steam introduced into the section 22 and the lighter ends removed therefrom, flow into and through a vapor line 29 to a heat exchanger 30 and through vapor line 31 into vapor line 18 and thence into condenser 19. The liquids condensed in the heat exchanger 30 may be refluxed back to the tower through connections 32 or all or a part of the liquid may be conducted to a re-run tank through connection 33, valves 34 and 35 being provided to control this flow.

The vapors flowing from the heat exchanger 30 to the condenser 19 may flow through the vapor line 31 as previously described, or, if desired, the vapor may be caused to pass through a steam jet vacuum pump 36 suitably connected to the vapor line 31 as shown. Valves 37, 38 and 39 control the flow of vapor through the vapor line 31 and/or the pump 36.

The upper stripping sections located at various points throughout the upper portion of the tower and which serve the side streams or intermediate fractions may be arranged somewhat similarly to the stripping sections at the bottom of the tower previously described. Only one of the upper stripping sections has been shown in the drawing, and only one will be described herein, but it will be understood that the disclosure will apply as well to the other stripping sections located in the upper part of the tower.

As shown, the upper stripping section represented generally at 40 is preferably enclosed in any suitable manner as by means of the ring-shaped shell 41, mounted in receiving ring 41a on the plate 42 and in engagement with the shell 10 of the tower. Plate 42 has a tubular vapor uptake 43 located centrally thereof and a plate 44 having a central aperture through which the uptake 43 extends, is mounted in the tower adjacent the upper end of the vapor uptake 43 and encloses the receiving ring 41a. Reflux from the bubble trays above the stripping section 40 accumulates on plate 44 and flows through downflow pipe 45 into receiving ring 41a, whence it passes to stripping section 40 through loop seal 46. Stripping steam is introduced into the stripping section 40 preferably through an inlet 47 connected to a steam coil 48 located in the lower part of the stripping section and having apertures 49 in the bottom thereof. Oil from stripping section 40 passes through connection 50 to a rundown tank, not shown. The steam introduced into the stripping section 40 and the vapors stripped from the oil therein, are preferably conducted to condenser 19 in a manner similar to that by which steam and vapors are conducted from stripping section 22 to the condenser 19. The vapors and steam from the stripping section 40 pass through vapor line 51 to a heat exchanger 52 and thence through vapor line 53 to vapor line 18 and to condenser 19. The liquid condensed in heat exchanger 52 may be refluxed back to the tower through connection 54 or may, if desired, be conducted to a re-run tank, not shown, through connection 55, suitable valves 56 and 57 being provided to control the flow of this liquid. As in the case with the vapors from the lower stripping section 22, the vapors from the heat exchanger 52 may be caused to pass through a steam jet vacuum pump 58 suitably connected to the vapor line 53, the vapor flow being controlled by the valves 59, 60 and 61.

In the operation of the tower, oil which has previously been heated, is introduced into the flash chamber 12 through inlet 11 at such a temperature that a portion of the oil is flashed into vapor. The vapors flashed off pass upwardly through the tower past baffles 13 and through bubble trays 14 into vapor line 16, through heat exchanger 17 and vapor line 18 to barometric condenser 19. The oil which collects on the plate 20 is conducted to stripping section 22 through loop seal 26 and is there passed countercurrent to stripping steam introduced through inlet 27. The steam and vapors stripped from the oil in stripping section 22, instead of passing upwardly through the fractionating sections of the tower, are conducted through vapor line 29 directly to heat exchanger 30 and thence through vapor line 31 to the condenser 19, or as previously described, the vapors may be caused to pass through steam jet vacuum pump 36 connected to vapor line 31.

With this arrangement, the steam and vapors from the stripping section 22 are caused to by-pass the fractionating or distilling sections of the tower and are passed directly to the condenser 19 through heat exchanger 30 and through pump 36, if desired. It will thus be seen that the pressure drop hereinbefore referred to through the tower and due to the resistance to the flow of the steam and oil vapors through the fractionating sections of the tower, will be avoided, practically the full vacuum produced by the condenser is made available in the stripping sections, and if the vapors are passed through the steam jet vacuum pump 36, even higher vacua will be produced in the stripping sections than in the fractionating sections of the tower, and in addition the amount of steam necessary for stripping will be decreased.

The same will be true of the upper stripping sections of the tower. The stripping steam introduced therein, together with the oil vapors stripped from the oil will by-pass the fractionating sections of the tower above each stripping section and will pass through vapor lines such as 51 directly to condenser 19 through heat exchanger equipment such as 52, and, if desired, through steam jet vacuum pumps, as 58.

In the form of the invention shown in Fig. 2, all or part of the stripping steam introduced into the lower stripping section 22 may be conducted to one or more of the upper stripping sections and there re-used for stripping. As shown, all or part of the steam and oil vapors passing through vapor line 29 from stripping section 22 may be caused to pass through steam jet vacuum pump 62 and all or part of the vapors discharged from jet 62 may flow through connection 65 and line 64 to the stripping section 40 and thence through line 66 to the stripping section above and in like manner through any or all of the other stripping sections employed, or all or part of the vapors discharged from jet 62 may pass through vapor line 29 to heat exchanger 30 and finally to condenser 19, or, all or part of the steam and vapors may be caused to flow through the connection 63 and all or part of the steam and vapors thus passing through connection 63 may flow through vapor line 64 to an upper stripping section 40, or through a connection 65 to the condenser 19 through heat exchanger 30. Suitable valves are provided, as shown, for controlling the flow of steam and vapors as desired.

The stripping steam so conducted to an upper stripping section 40 from the lower stripping section 22 and thence reused for stripping, may, with the entrained oil vapors, be passed to the condenser 19 through vapor line 51 or may, if desired, be conducted through vapor line 66 to another stripping section and there re-used for stripping. In this form, it is apparent that whether the stripping steam introduced into one of the stripping sections is re-used in another stripping section or not, the steam and the entrained oil vapors are caused to by-pass the fractionating sections of the tower and thus avoid the pressure drop through the tower and the attendant disadvantages.

In either of the forms of the invention disclosed, it is apparent that the stripping steam is kept out of the heat exchanger equipment which is associated with the fractionating system, as a result of which the efficiency of the heat exchanger equipment is increased, so that the use of smaller equipment for meeting certain conditions may be possible.

While a vacuum fractionating tower has been disclosed with the stripping sections arranged inside the tower, it will, of course, be understood that any one or all of the stripping sections employed may be located outside the tower.

It is understood that the forms of the invention shown and described are to be considered preferred forms only and that the invention is not to be limited except by the scope of the appended claims.

What we claim is:

1. A vacuum fractionating tower comprising a fractionating section and a stripping section, a condenser connected with and adapted to maintain a vacuum in the tower, a conduit connecting the stripping section and the condenser, and vacuum producing means in said conduit whereby a higher vacuum is maintained in the stripping section than in the tower.

2. A vacuum fractionating tower comprising a flash chamber, a plurality of fractionating sections and a plurality of stripping sections arranged alternately with the fractionating sections, means connecting the flash chamber with one of the stripping sections, means for maintaining a vacuum in the tower, means for conducting vapors from the fractionating sections to the vacuum maintaining means and means by-passing the fractionating sections and the tower for conducting vapors from the stripping sections to the vacuum maintaining means.

3. A fractionating tower comprising a fractionating section and an enclosed stripping section, vacuum producing means, a conduit connecting the fractionating section with said means, a second conduit connecting the enclosed stripping section and said means, whereby vacua are maintained in the fractionating and stripping sections, and additional vacuum-producing means in the said second conduit whereby a higher vacuum is maintained in the stripping section than in the fractionating section.

4. A vacuum fractionating tower comprising a plurality of fractionating sections and a plurality of stripping sections, means for supplying steam to one of the stripping sections and means for conducting steam from said stripping section to another stripping section.

5. A vacuum fractionating tower comprising a plurality of fractionating sections and a plurality of stripping sections, means for supplying steam to at least one of the stripping sections, and means comprising conduits connecting the stripping sections for conducting steam from one stripping section to another.

6. A vacuum fractionating tower comprising a plurality of fractionating sections and a plurality of stripping sections arranged alternately with the fractionating sections and means by-passing the fractionating sections for conducting vapors from one stripping section to another.

7. A vacuum fractionating tower comprising a plurality of fractionating sections and a plurality of stripping sections arranged alternately with the fractionating sections, means connected with the tower and adapted to maintain a vacuum therein, and means by-passing the fractionating sections for conducting vapors from one stripping section to another and to the vacuum maintaining means.

8. A vacuum fractionating tower comprising a plurality of fractionating sections and a plurality of stripping sections arranged alternately with the fractionating sections, means connected with the tower and adapted to maintain a vacuum therein, conduits connecting the stripping sections and said means whereby vapors from the stripping sections are caused to by-pass the fractionating sections, and vacuum producing means in said conduits.

9. A vacuum fractionating tower comprising a plurality of fractionating sections and a plurality of stripping sections arranged alternately with the fractionating sections, means for maintaining a vacuum within the tower, means connecting the vacuum maintaining means and the tower, a conduit connecting each stripping section with another, a conduit connecting one of the stripping sections with the vacuum maintaining means whereby vapors from the stripping sections by-pass the fractionating sections and are conducted from one stripping section to another and from one of said stripping sections to the vacuum maintaining means, and vacuum producing means in the conduits connecting the stripping sections and in said conduit connecting one of the stripping sections with the first mentioned vacuum maintaining means whereby higher vacua are maintained in the stripping sections than in the fractionating sections.

10. A vacuum fractionating tower comprising a plurality of fractionating sections and a plurality of stripping sections arranged alternately with the fractionating sections, vacuum maintaining means for maintaining a vacuum within the tower, means for connecting the vacuum maintaining means and the tower, conduits connecting each stripping section with another and connecting the uppermost stripping section with the vacuum maintaining means whereby vapors from the stripping sections by-pass the fractionating sections and are conducted from one stripping section to another and from the uppermost stripping section to the vacuum maintaining means, and vacuum producing means in the conduits connecting the stripping sections and in the conduit connecting the uppermost stripping section with the first mentioned vacuum maintaining means whereby higher vacua are maintained in the stripping sections than in the fractionating sections.

11. A vacuum fractionating tower comprising a plurality of fractionating sections and a plurality of stripping sections arranged alternately with the fractionating sections, vacuum producing means for maintaining a vacuum within the tower, means for connecting the vacuum producing means and the tower, a conduit connecting each stripping section with another, a conduit connecting the uppermost stripping section with the vacuum producing means, whereby vapors from the stripping sections by-pass the fractionating sections and are conducted from one stripping section to another and from the uppermost stripping section to the vacuum producing means.

12. Fractionating apparatus comprising a fractionating section and a stripping section, vacuum producing means adapted to maintain vacua in the fractionating section and the stripping section and additional vacuum producing means intermediate the stripping section and the first mentioned vacuum producing means.

13. Fractionating apparatus comprising a fractionating section and a stripping section, vacuum producing means connected to the fractionating section and the stripping section and additional vacuum producing means in the connection between the stripping section and the first mentioned vacuum producing means.

14. Fractionating apparatus comprising a fractionating tower having means therein for passing vapors counter-current to liquid, an enclosed stripping section in the tower, vacuum producing means connected to the tower and to the stripping section and additional vacuum producing means in the connection between the stripping section and the first mentioned vacuum producing means.

15. Fractionating apparatus comprising a fractionating section and a stripping section, vacuum producing means connected to the fractionating section and the stripping section, additional vacuum producing means in the connection between the stripping section and the first mentioned vacuum producing means and a by-pass around said additional vacuum producing means.

16. Fractionating apparatus comprising a fractionating section and a plurality of stripping sections, means for supplying steam to one of the stripping sections and means for conducting steam from said stripping section to another stripping section.

17. Fractionating apparatus comprising a fractionating tower having means therein for passing vapors counter-current to liquid, a plurality of enclosed stripping sections, vacuum producing means connected to the tower and to each of the stripping sections, means for withdrawing liquid from different levels of the tower and introducing such liquid into the several stripping sections, means for introducing steam into at least one of the stripping sections, a connection between said last mentioned stripping section and another stripping section and vacuum producing means in the connection between the stripping sections.

18. Fractionating apparatus comprising a fractionating tower having means therein for passing vapors counter-current to liquid, a plurality of enclosed stripping sections, vacuum producing means connected to the tower and to each of the stripping sections, means for withdrawing liquid from different levels of the tower and introducing such liquid into the several stripping sections, means for introducing steam into at least one of the stripping sections, a connection between said last mentioned stripping section and another stripping section, vacuum producing means in the connection between the stripping sections and a by-pass in said connection around said vacuum producing means.

19. A method of stripping the lower boiling fractions from intermediate fractional condensates obtained by the fractional distillation of hydrocarbon oils which includes the steps of fractionating hydrocarbon oil in a fractionating zone in which a plurality of fractional condensates are formed, withdrawing said condensates from said fractionating zone and introducing them into stripping zones maintained at respective lower pressures than those existing at the points in the fractionating zone from which said fractional condensates are withdrawn, stripping said condensates with steam and withdrawing the respective stripped fractional condensates from said stripping zones, the operation being such that the steam and vapors evolved in stripping a fractional condensate will contact with the lighter fractional condensates in said stripping zones.

20. The method of fractionally distilling hydrocarbon oils which comprises passing vapors of the oil through a fractionating zone in which vapors are condensed in separate pools of condensates, removing condensates from a plurality of said pools and introducing said condensates respectively into a plurality of stripping zones wherein the condensate is out of direct contact with the vapors in the fractionating zone, introducing a stripping medium into one of the stripping zones to remove the light constituents from the condensate therein, passing the stripping medium and the vapors evolved in the last mentioned stripping zone into contact with the condensate in another stripping zone, and withdrawing stripped condensate from each stripping zone.

21. The method of fractionally distilling hydrocarbon oils which comprises passing vapors of the oil through a fractionating zone in which vapors are condensed in separate pools of condensates, removing condensates from a plurality of said pools and introducing said condensates respectively into a plurality of stripping zones wherein the condensate is out of direct contact with the vapors in the fractionating zone, introducing a stripping medium into one of the stripping zones to remove the light constituents from the condensate therein, passing the stripping medium and the vapors evolved in the last mentioned stripping zone into contact with a lighter fractional condensate in another stripping zone and withdrawing stripped condensate from each stripping zone.

22. The method of fractionally distilling hydrocarbon oils which comprises passing vapors of the oil through a fractionating zone in which vapors are condensed in separate pools of condensates, removing condensates from a plurality of said pools and introducing said condensates respectively into a plurality of stripping zones wherein the condensate is out of direct contact with the vapors in the fractionating zone, maintaining a pressure in each stripping zone which is lower than the pressure at the point in the fractionating zone from which the condensate is withdrawn for introduction into the stripping zone, introducing a stripping medium into one of the stripping zones to remove the light constituents from the condensate therein, passing the stripping medium and the vapors evolved in the last mentioned stripping zone into contact with the condensate in another stripping zone, and withdrawing stripped condensate from each stripping zone.

23. The method of fractionally distilling hydrocarbon oils which comprises passing vapors of the oil through a fractionating zone in which vapors are condensed in separate pools of condensates, removing condensates from a plurality of said pools and introducing said condensates respectively into a plurality of stripping zones wherein the condensate is out of direct contact with the vapors in the fractionating zone, introducing a stripping medium into each stripping zone to remove the light constituents from the condensate therein, passing the stripping medium and the vapors evolved in one of the stripping zones into contact with a lighter fractional condensate in another stripping zone and withdrawing stripped condensate from each stripping zone.

24. The method of fractionally distilling hydrocarbon oils which comprises introducing oil heated to vaporization temperature into a fractionating zone wherein part of the oil is vaporized and separated from the unvaporized portion, fractionally condensing the vaporized portion of the oil in separate pools of condensate, removing condensate from one of said pools and introducing it into a stripping zone, removing the unvaporized portion of the oil from the fractionating zone and introducing it into another stripping zone, introducing a stripping medium into the last mentioned stripping zone to remove the light constituents from the oil therein, passing the stripping medium and the vapors evolved in the last mentioned stripping zone into contact with the condensate in the first mentioned stripping zone, and withdrawing stripped liquid from each stripping zone.

25. Fractionating apparatus comprising a fractionating section wherein a plurality of pools of fractional condensates are formed, a plurality of stripping sections, means for withdrawing condensate from a plurality of said pools in the fractionating section and introducing the same respectively into the stripping sections, means for introducing a stripping medium into contact with the condensate in one of the stripping sections to remove the light constituents therefrom, means for passing the stripping medium and the vapors evolved from said stripping section into contact with the condensate in another stripping section, and means for withdrawing stripped condensate from the stripping sections.

26. Fractionating apparatus comprising a fractionating section wherein a plurality of pools of fractional condensates are formed, a plurality of stripping sections, means for withdrawing condensate from a plurality of said pools in the fractionating section and introducing the same respectively into the stripping sections, means for introducing a stripping medium into contact with the condensate in one of the stripping sections to remove the light constituents therefrom, means for passing the stripping medium and the vapors evolved from said stripping section into contact with a lighter fractional condensate in another stripping section, and means for withdrawing stripped condensate from the stripping sections.

27. Fractionating apparatus comprising a fractionating section wherein a plurality of pools of fractional condensates are formed, a plurality of stripping sections, means for withdrawing condensate from a plurality of said pools in the fractionating section and introducing the same respectively into the stripping sections, means for maintaining a pressure in each stripping section which is lower than the pressure at the point in the fractionating section from which the condensate is withdrawn for introduction into the stripping section, means for introducing a stripping medium into contact with the condensate in one of the stripping sections to remove the light constituents therefrom, means for passing the stripping medium and the vapors evolved from said stripping section into contact with the condensate in another stripping section, and means for withdrawing stripped condensate from the stripping sections.

28. Fractionating apparatus comprising a fractionating section, means for introducing oil heated to vaporization temperature into the fractionating section wherein part of the oil is vaporized and separated from the unvaporized portion, means in the fractionating section for fractionally condensing the vaporized portion of the oil in separate pools of condensate, a stripping section, means for removing condensate from one of the pools in the fractionating section and introducing it into the stripping section, a second stripping section, means for removing unvaporized oil from the fractionating section and introducing it into the second stripping section, means for introducing a stripping medium into the second stripping section to remove the light constituents from the oil therein, means for passing the stripping medium and the vapors evolved in the second stripping section into contact with the condensate in the first mentioned stripping section, and means for withdrawing stripped liquid from each stripping section.

29. A method of stripping the lower boiling fractions from condensate fractional side streams obtained by the fractional distillation of hydrocarbon oils which includes the steps of fractionating hydrocarbon oil in a fractionating zone in which a plurality of fractional condensates are formed, withdrawing said condensates and introducing them into a stripping zone at respective points of lower pressure than that existing at the points in the fractionating zone from which said fractional condensates were withdrawn, stripping said condensates with steam while passing the evolved vapors and steam countercurrent to the respective fractional condensates entering said stripping zone and withdrawing the respective stripped fractional condensates from said stripping zone, the operation being such that the steam and vapors evolved in stripping a fractional condensate will contact with the lighter fractional condensates in said stripping zone.

30. Fractionating apparatus comprising a fractionating section wherein a plurality of pools of fractional condensates are formed, a plurality of stripping sections, means for withdrawing condensate from a plurality of said pools in the fractionating section and introducing the same respectively into the stripping sections, means for maintaining a pressure in each stripping section which is lower than the pressure at the point in the fractionating section from which the condensate is withdrawn for introduction into the stripping sections, means for introducing a stripping medium into contact with the condensate in one of the stripping sections to remove the light constituents therefrom, means for passing the stripping medium and the vapors evolved from said stripping section into contact with a lighter fractional condensate in another stripping section, and means for withdrawing stripped condensate from the stripping sections.

31. Fractionating apparatus comprising a fractionating section, means for introducing oil heated to vaporization temperature into the fractionating section wherein part of the oil is vaporized and separated from the unvaporized portion, means in the fractionating section for fractionally condensing the vaporized portion of the oil in separate pools of condensate, a striping section, means for removing condensate from one of the pools in the fractionating section and introducing it into the stripping section, a second stripping section, means for removing a lighter fractional condensate from the fractionating section and introducing it into the second stripping section, means for introducing a stripping medium into the first stripping section to remove the light constituents from the oil therein, means for passing the stripping medium and the vapors evolved in the first stripping section into contact with the condensate in the second stripping section, and means for withdrawing stripped liquid from each stripping section.

32. Fractionating apparatus comprising a fractionating section, means for introducing oil heated to vaporization temperature into the fractionating section wherein part of the oil is vaporized and separated from the unvaporized portion, means in the fractionating section for fractionally condensing the vaporized portion of the oil in separate pools of condensate, a stripping section, means for removing condensate from one of the pools in the fractionating section and introducing it into the stripping section, a second stripping section, means for removing unvaporized oil from the fractionating section and introducing it into the second stripping section, means for introducing a stripping medium into the second stripping section to remove the light constituents from the oil therein, means for passing the stripping medium and the vapors evolved in the second stripping section into contact with the condensate in the first mentioned stripping section, means for withdrawing stripped liquid from each stripping section, means for condensing the vapors evolved in the stripping sections, and means for returning said condensate to said fractionating section as reflux.

33. Fractionating apparatus comprising a fractionating section, means for introducing oil heated to vaporization temperature into the fractionating section wherein part of the oil is vaporized and separated from the unvaporized portion, means in the fractionating section for fractionally condensing the vaporized portion of the oil in separate pools of condensate, a stripping section, means for removing condensate from one of the pools in the fractionating section and introducing it into the stripping section, a second stripping section, means for removing a lighter fractional condensate from the fractionating section and introducing it into the second stripping section, means for introducing a stripping medium into the first stripping section to remove the light constituents from the oil therein, means for passing the stripping medium and the vapors evolved in the first stripping section into contact with the condensate in the second stripping section, means for withdrawing stripped liquid from each stripping section, means for condensing the vapors evolved in the stripping sections, and means for returning said condensate to said fractionating section as reflux.

DION K. DEAN.
EVERETT NORMAN SIEDER.